(12) United States Patent
Samant et al.

(10) Patent No.: US 6,313,896 B1
(45) Date of Patent: *Nov. 6, 2001

(54) METHOD FOR FORMING A MULTI-DOMAIN ALIGNMENT LAYER FOR A LIQUID CRYSTAL DISPLAY DEVICE

(75) Inventors: Mahesh Govind Samant, San Jose; Joachim Stöhr, Woodside, both of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/387,215

(22) Filed: Aug. 31, 1999

(51) Int. Cl.[7] .................................................. G02F 1/1337
(52) U.S. Cl. .............................. 349/124; 349/187; 438/30
(58) Field of Search .................................. 438/27, 29, 30; 349/187, 122–136; 428/1.1, 1.2

(56) References Cited

U.S. PATENT DOCUMENTS

| | | |
|---|---|---|
| 4,568,833 | 2/1986 | Roelofs . |
| 4,683,378 | 7/1987 | Shimase et al. . |
| 4,785,188 | 11/1988 | Mori et al. . |
| 4,939,360 | 7/1990 | Sakai . |
| 5,065,034 | 11/1991 | Kawanami et al. . |
| 5,151,605 | 9/1992 | Politiek et al. . |
| 5,268,781 | * 12/1993 | Shigeta et al. . |
| 5,309,264 | 5/1994 | Lien et al. . |
| 5,410,422 | 4/1995 | Bos . |
| 5,479,282 | 12/1995 | Toko et al. . |
| 5,508,832 | 4/1996 | Shimada . |
| 5,550,662 | 8/1996 | Bos . |

(List continued on next page.)

OTHER PUBLICATIONS

Jérôme (1991), "Surface Effects and Anchoring in Liquid Crystals," *Rep. Prog. Phys.*, 54:391–451.

Lee et al. (1997), "Microscopic Molecular Re–Orientation of Polymer Surfaces Induced by Rubbing and Factors Determining LC Pretilt Angles," *Polymer Surfaces and Interfaces: Characterization, Modification and Application*, pp. 295–315.

Lien et al. (1995), "UV Modification of Surface Pretilt of Alignment Layers for Multidomain Liquid Crystal Displays," *Appl. Phys. Lett.* 67(21):3108–3110.

*Primary Examiner*—Charles Bowers
*Assistant Examiner*—Evan Pert
(74) *Attorney, Agent, or Firm*—Reed & Associates

(57) ABSTRACT

A method for producing a multi-domain alignment layer, as well as multi-domain alignment layers produced thereby and liquid crystal displays comprising the same, are provided. In the subject method, an alignment layer is produced on an alignment surface by directing an ion beam or ion beams at the surface at an angle not equal to 90°, so that the ions contact the surface at non-normal incidence. The substrate may be rotated or the ion beam(s) re-directed or the ion beam source moved so that the surface may be bombarded from different directions in different regions resulting in multiple alignment layer domains with differing alignment. In an alternative embodiment, two ion beams with different angles of incidence may be directed at the surface simultaneously or sequentially, thereby creating multiple alignment layer domains without need for rotation of the substrate. The resultant multi-domain alignment layers find use in liquid crystal display devices.

12 Claims, 2 Drawing Sheets

U.S. PATENT DOCUMENTS

| | | |
|---|---|---|
| 5,576,862 | 11/1996 | Sugiyama et al. . |
| 5,608,556 | 3/1997 | Koma . |
| 5,657,105 | 8/1997 | McCartney . |
| 5,661,366 | 8/1997 | Hirota et al. . |
| 5,717,474 | 2/1998 | Sarma . |
| 5,721,600 | 2/1998 | Sumiyoshi et al. . |
| 5,757,455 | 5/1998 | Sugiyama et al. . |
| 5,770,826 | 6/1998 | Chaudhari et al. . |
| 6,124,914 * | 9/2000 | Chaudhari et al. . |

* cited by examiner

METHOD FOR FORMING A MULTI-DOMAIN ALIGNMENT LAYER FOR A LIQUID CRYSTAL DISPLAY DEVICE

TECHNICAL FIELD

This invention relates generally to the field of liquid crystal display devices and to methods for forming alignment layers for such devices. More particularly, the invention pertains to a method for forming a multi-domain alignment layer for a liquid crystal display using focused ion beams.

BACKGROUND

Liquid crystal displays find use in a variety of different applications, such as in data displays in watches, calculators and the like, as well as in flat panel displays found in laptop or notebook computers. Liquid crystal displays offer many advantages over alternative technologies such as cathode ray tube displays, including low power consumption, small size, light weight, and the like. For these reasons, liquid crystal displays are expected to eventually replace present competing display devices in a wide variety of applications, including desktop computer monitors and televisions.

Liquid crystal (LC) materials are composed of rod-like molecules that may be aligned by intermolecular forces and in response to external electric fields. A liquid crystal display (LCD) device includes cells of an LC material with the LC material present between two opposing transparent glass plates with electrodes, or between a transparent glass plate with an electrode and a reflective plate with an electrode. The glass plates serve as substrates for the other elements, although a plate with its attached elements may also be called a substrate. Electrodes are commonly made of indium tin oxide (ITO), which is transparent. Polarizer plates or materials are placed on the outer surfaces of the glass plates. Onto the inner surfaces of the glass plates, on top of the electrodes, an alignment film (commonly polyimide) is coated. The alignment film may be treated or modified so that it has an alignment layer which can orient nearby LC molecules. There is a gap, a few microns wide, between the two plates, so that the alignment films are parallel but do not directly contact each other. LC molecules are filled into this gap. The entire assembly may be transparent, and is capable either of modulating light that passes through it, or, if one substrate is reflective, of modulating reflected light. In order to modulate transmitted or reflected light, and to provide contrast, it is necessary to control the orientation of the LC molecules that fill the gap between the plates, since the orientation of these molecules alters the polarization of light passing through the gap. The two polarizer plates are generally "crossed" (oriented at 90° to each other), so that, unless the polarization of the light changes as the light passes between the plates, polarized light that passes through one plate will not pass through the other. It is the re-orientation of the LC molecules in response to the electric fields that are imposed by the electrodes that alters the polarization of light passing between the plates and varies the intensity of the light leaving the device. The varying light intensity of a multitude of cells operating in parallel forms the images that allow the device to operate as a display.

LC molecules stack to fill the space between the plates, with the long axis of the rod-like LC molecules nearly parallel to the plane of the surfaces of the alignment film on the substrates, and with adjacent molecules aligned in generally the same orientation by the alignment layer. At the limits of the gap, the LC molecules have to be anchored down in such a way as to align with the two crossed polarizer plates adjacent to these films. Since these alignment directions are at 90° to each other, molecules on opposite sides of the gap between the plates point in perpendicular directions although in planes nearly parallel to the surfaces of the polyimide substrates. In between, across the breadth of the gap, the orientation of the LC molecules gradually shifts between the two orientations. The LC molecules thus form a twisted helix from one side to the other. However, the orientation of the LC molecules can be adjusted by the alteration of an electric field imposed between the plates.

Light entering an LCD device passes through, and is polarized by, a first polarizer before encountering the LC molecules in the gap between the plates. The first LC molecules in this gap are anchored to the nearest alignment layer, and are aligned with their long axes parallel to that of the adjacent polarizer. A second polarizer with polarization plane perpendicular to the first polarizer is in place at the opposite plate. If there were no change in the polarization of the light passing through the gap, virtually no light would emerge from the second plate since the planes of polarization are perpendicular. However, as the light progresses through the LC material to the second plate and second polarizer, the gradual helical twisting of the LC orientation changes the polarization of the light from linear to elliptical, so that part of the incoming light is transmitted by the second, perpendicular polarizer, allowing some light to emerge for viewing by an observer. Since the amount of light that is transmitted depends on the orientation of the LC molecules, rotation of the long axis of the rod-like LC molecules changes the amount of light that is transmitted. The orientation of the LC molecules is changed by the application (via the electrodes) of small voltages to each color cell within all the pixels.

In typical flat panel displays currently found in many laptop computers, the picture on the screen of the display is composed of many hundreds of thousands of pixels (so-named because each pixel is one "picture element"). Each pixel may be further divided into smaller regions ("color cells") that provide differently-colored spots within the pixel. In this way, the desired color is created in each pixel by "mixing" blue, green and red primary colors of different intensities by using patterned color filters of these three colors. The intensity of each color is adjusted by separate electrodes to orient the LC molecules to change the light intensity transmitted out of the front of the display.

As the voltage of the electrodes is increased, the LC long axis becomes increasingly parallel to the electric field direction, which is parallel to the light transmission direction, and not parallel to the planes of the substrates. Orienting the LC molecules more closely to that of the electric field reduces light transmission. Thus, it is apparent that the proper orientation of the LC molecules is critical to the operation of an LCD device.

The alignment film, with its alignment layer, that forms the boundary between LC-filled gap and the plate is the most important feature used to align the LC molecules to the substrate. The alignment layer is an insulating layer composed of molecules that are aligned in a predetermined direction, and serves to orient the LC molecules in that direction. The alignment of the alignment layer molecules is determined by the molecular structure of that layer, and is stable, the molecules being bound to the substrate and each other. The alignment layer imposes an ordered orientation upon the LC molecules directly in contact with it through non-covalent molecular interactions such as van der Waals, ionic and steric interactions. The rod-like LC molecules in contact with the alignment layer can and do orient to accommodate to the fixed orientation of the alignment layer.

Polyimide films are commonly used to form alignment films with alignment layers. Such films can be formed by applying a wet coat of polyimide to a substrate, as can be done by known printing or spinning techniques, baking the wet coat to form a polyimide film on the substrate that may then be run through a roller to even out the surface of the film. Then, some technique for providing alignment properties to the film must be applied.

The preferred technique for providing an alignment layer in an alignment film such as a polyimide film has been to deposit an alignment film on each transparent electrode, to rub or abrade the film with a gigged, flocked or velvet cloth in a desired direction and, subsequently to clean the film to remove debris left by the rubbing process before assembling the transparent substrates to form a LC cell. This method thus requires direct contact with the surface of the alignment film. The numerous steps required by this process are time consuming and costly. Mechanical rubbing methods introduce contamination on the rubbed surface and therefore require cleaning the surface with detergents or solvents. Such contamination is unsuitable for a clean-room environment and requires a special room within a clean-room to produce the alignment layer, adding a significant cost to manufacturing. Uneven pressure and the varying directionality of the rubbing contacts with the polymer surface lead to non-uniformities in the alignment layer. Further, if a post spacer is incorporated for maintaining an equal spacing between the two plates, mechanical rubbing will cause a shadow effect. In addition, it is difficult to implement the desired multi-domain and wide viewing angle technology that are among the objects of the present invention when contact methods are used to produce an alignment layer.

Other methods and materials for creating LC alignment layers include stretching a polymer (Aoyama et al., Mol. Cryst. Liq. Cryst. 72:127(1981)), creating a Langmuir-Blodgett film (Ikeno, et al., Jpn. J. Appl. Phys. 27:L475 (1988)), creating a grating structure by microlithography (Nakamura and Ura, J. Appl. Phys. 52:210 (1981)), depositing SiOx by oblique angle deposition (Ienuing, Appl. Phys. Lett. 21:173 (1982)), and applying polarized UV radiation to a polymer film (Schadt, et al., Jpn. J. Appl. Phys. 31:2155 (1992)). All of these methods are very expensive and time consuming and have not achieved satisfactory results. Most of the aforementioned processes entail a large number of processing steps, which creates more possibility for error, lower device yields, and increases in fabrication time and device cost. Accordingly, there is a need for a more efficient and cost effective method to provide an alignment layer on a substrate.

A display is said to be "single domain" if the LC molecules have a single pre-tilt angle along one azimuthal direction of the surface plane (i.e. the long axis of the LC molecules is orientated along in-plane direction and tilted up from that direction by a well defined angle which, in the case of current 12.1 inch SVGA displays, is a few degrees) and hence the long axes of all LC molecules appear more or less parallel to each other over the whole display. A multi-domain display contains at least two differently oriented single domain regions such that the two or more single domain regions form a color sub-pixel of the display.

A drawback of many currently employed single-domain liquid crystal displays is that such devices are characterized by having a narrow or limited viewing angle. An advantage of multi-domain LCD devices is the greater viewing angle as compared to single-domain LCD devices. That is, an observer will have wider selection of viewing angles with which to perceive the display of a multi-domain LCD device as compared to a single-domain LCD device. As such, a number of different methods have been developed for producing multi-domain liquid crystal displays. Such methods include the mask rubbing two domain method (JP-106624), the fringe field two domain method (U.S. Pat. No. 5,309,264 to Lien and John), the double alignment layer two domain method (Koike et al., SID International Symposium Dig. Tech. Papers (1992) 23:798–801) and the UV treatment two domain method (Lien et al. (1995) Appl. Phys. Lett. 67:3108). Yet another approach to improving the viewing angle of liquid crystal displays has been to employ a textured alignment layer. See Nikkei, Flat Panel Display (1998) 104 to 107. The present inventors have applied for patent on yet another method for producing multi-domain alignment layers by using an electric field to change the angle of incidence of an ion beam bombarding a surface so that the ions contact the surface at non-normal incidence (U.S. patent application Ser. No. 09/185,234, filed Nov. 3, 1998).

Despite the development of the above methods for producing multi-domain LC displays, there continues to be an interest in the development of new methods of producing multi-domain displays with broader viewing angles. Ideally, such methods should have a minimal number of steps, be efficient and be adaptable to clean-room high throughput manufacturing. Thus, there is need for a controllable non-contact method of producing multi-domain displays with broad viewing angles. The present invention is addressed to this need in the art.

The following patents pertain to one or more aspects of the invention and thus provide useful background information: U.S. Pat. No. 5,757,455 to Sugiyama et al., which relates generally to alignment layers; U.S. Pat. No. 5,721,600 to Sumiyoshi et al., relating to LCD devices; U.S. Pat. No. 5,717,474 to Sarma, pertaining to multi-domain LCD devices; U.S. Pat. No. 5,657,105 to McCartney, relating to multi-domain LCD devices; U.S. Pat. No. 5,608,556 to Koma, pertaining to multi-domain LCD devices and methods for controlling the orientation of LC molecules; U.S. Pat. No. 5,576,862 to Sugiyama et al., relating to multi-domain LCDs and alignment layers therefor; U.S. Pat. No. 5,550,662 to Bos, relating to color LCDs with wide viewing angles; U.S. Pat. No. 5,508,832 to Shimada, relating to methods for producing multi-domain LCD devices; U.S. Pat. No. 5,479,282 to Toko et al., which relates to multi-domain LCDs; U.S. Pat. No. 5,410,422 to Bos, which relates to a wide-angle gray-scale LCD display; and U.S. Pat. No. 5,309,264 to Lien et al., pertains to multi-domain LCD displays.

SUMMARY OF THE INVENTION

A method for producing alignment layers, as well as alignment layers produced thereby and liquid crystal display devices incorporating the same, are provided. In the subject method, an alignment layer is produced on the surface of a substrate by bombarding an alignment film on the substrate surface with ions directed at the surface at an angle not equal to 90°, so that the ions contact the surface at non-normal incidence. After bombardment, the ion source may be moved, or the substrate may be rotated, and the substrate then subjected to a subsequent bombardment from a different orientation thereby creating multiple alignment layer domains. Alternatively, two ion beams incident at different angles may be simultaneously or sequentially directed at the surface so as to create multiple alignment layer domains without rotation of the substrate. The alignment layers produced by the subject methods find use in liquid crystal display devices.

DETAILED DESCRIPTION OF THE INVENTION

Figure 2:
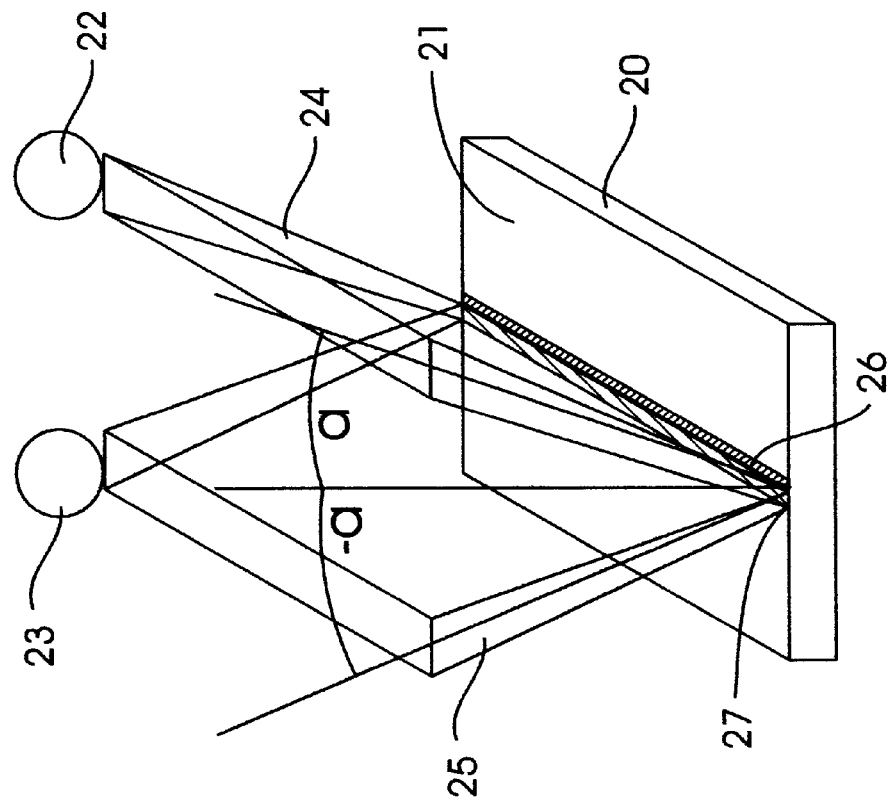
FIG. 2 provides a representation of simultaneous bombardment of a substrate surface with two ion beams incident at different angles according to the method of the invention wherein multiple alignment directions are formed by the operation of two distinct ion beams.

Before describing the present invention in detail, it is to be understood that this invention is not limited to specific process steps, materials, device configurations or the like, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly indicates otherwise. Unless otherwise defined, all technical and scientific terms used herein have the same meanings commonly understood by one of ordinary skill in the art to which this invention belongs.

The term "ion beam" is used herein to mean a moving stream of atoms, molecules or clusters with neutral or ionic charge. Typically, these atoms, molecules or clusters are charged, hence the term "ion," although the beam may be composed completely or in part of neutral species along at least part of its path of travel.

The term "bombardment" is used herein to refer the interaction of an ion beam with a surface towards which it is directed. By "bombarding" is meant that a surface is exposed to or irradiated by a beam consisting of atoms, molecules, or clusters with neutral or ionic charge. It is to be understood that the intensity, duration, and angle at which an ion beam bombards a surface may be varied.

The term "angle of incidence" is used herein to mean the angle formed by the direction of an ion beam and the plane of the surface upon which the ion beam is directed.

The term "pre-tilt angle" is used herein to mean the angle between the long axis of a liquid crystal molecule and the plane of the substrate, in the absence of an applied electric field.

The term "alignment layer" is used herein to mean the layer, of a surface or substrate, that contains aligned or oriented atoms or molecules, and which can impart an alignment or orientation to nearby atoms or molecules.

The term "alignment film" is used herein to mean a film which may be modified to produce an alignment layer, and the film that contains that layer after such modification.

The term "alignment surface" is used herein to mean a surface can be altered to have, or that has, an alignment layer.

The term "alignment direction" is used herein to mean the direction that an alignment layer can impart to nearby atoms or molecules.

The terms "alignment region" and "alignment domain" are used interchangeably herein to refer to a region or domain of an alignment layer in which the alignment direction is substantially the same.

The term "single-domain alignment layer" is used herein to mean an alignment layer that has a single alignment direction.

The term "multi-domain alignment layer" is used herein to mean an alignment layer that has more than one alignment direction. A region with substantially one alignment direction is a domain; a domain in a multi-domain alignment layer will be located near and preferably adjacent to a domain with a different alignment direction; the domains of a multi-domain alignment layer will comprise at least two alignment directions.

The term "liquid crystal" is used herein to mean a material that has the ability to flow like a liquid yet possesses anisotropic physical properties similar to those of crystalline solids. Thus, a liquid crystal may have ordered regions, as in ordered packing of rod-like molecules, yet the ordering of these regions may be readily changed by external factors such as imposition of a voltage gradient.

The term "liquid crystal display" is used herein to mean a display that uses liquid crystal material to form an image perceptible to a human observer.

The term "liquid crystal display device" is used herein to mean a device comprising a liquid crystal display.

The term "liquid crystal material" is used herein to mean a material or composition that is capable of forming liquid crystals. Liquid crystal materials may be single molecules or may be mixtures of different molecules, such as mixtures of biphenyls and terphenyls, and are well-known in the art.

The term "liquid crystal molecule" is used herein to mean a molecule of a liquid crystal material. Such molecules are commonly elongated organic molecules, such as cholestryl chloride, and are well-known in the art.

The term "conducting layer" is used herein to mean a layer capable of passing electric current or applying a voltage. Conducting layers are commonly made from tin oxide, or indium tin oxide, or other suitable material coated or applied to a suitable substrate such as glass. Conducting layers may be patterned so that the conductor forms paths or regions on the substrate with areas of the substrate void of the conducting material.

The term "substrate" is used herein to mean a surface, or a material having a surface, suitable for the application or coating of layers such as conducting layers, alignment layers, and the like. A surface or material with its attached layers may also be called a substrate.

The term "electrode" is used herein to mean a means for conducting electricity. Electrodes are commonly wires of conducting material such as a metal; the conducting layer comprises an electrode, and a patterned conducting layer comprises a plurality of electrodes. Commonly, metallic wires may be operably attached to the conducting layer to provide appropriate electronic signals to control the electric field between the alignment layers of a liquid crystal display.

The present invention provides a method for producing multi-domain alignment layers, which are in turn suitable for producing multi-domain liquid crystal displays and display devices such as are useful in computers, panel displays, watches, and the like. In the practice of the present invention, an alignment film on the surface of a substrate is bombarded with ions in a manner sufficient to induce bond anisotropy in the film (at least in the upper strata or layers of the film) and, as such, to produce an alignment layer on the substrate surface, where the alignment layer is "multi-domain" in that it has domains containing LC molecules with different pre-tilt angles. The substrate on which the alignment film is positioned may be fabricated from a variety of materials, usually polarized materials, including glasses, plastics, etc, where such materials suitable for use as substrates in liquid crystal display devices are known in the art. The substrate may or may not be optically transparent, depending on the nature of the device into which it is to be incorporated, e.g., the substrate may be reflective. The overall dimensions of the substrate will vary widely depending on the intended use of the display fabricated therefrom, but will generally have a length that ranges from about 1 cm to 200 cm, and a width that ranges from about 1 cm to 200 cm.

Layered on the surface of the substrate is an alignment film. An alignment film is a layer of any material that contains, or can be modified to contain, aligned or oriented atoms or molecules, and which can impart an alignment or orientation to nearby atoms or molecules. In the methods of the present invention, the alignment film may be any material that can be bombarded with ions to induce anisotropy in the surface strata of the material such that the bond orientations at the surface of the film show in-plane asymmetry in a single direction but with out of surface asymmetry in at least two directions to yield multi-domain alignment. The alignment film may range in thickness from about 2 to 10,000 Å, usually from about 5 to 1,000 Å and more usually from about 10 to 100 Å. Suitable materials are insulating, optically transparent, particularly in the visible range, and may be materials that are produced by either wet processes or dry processes, where dry processed materials are preferred. Wet process alignment materials or films that find use include polyimide films, and the like, where such materials, as well as methods for their deposition on the surface of a transparent planar component, are known to those of skill in the art.

Dry process materials finding use as alignment films on the surface of the substrate are materials that are optically transparent and amorphous or fine-grained, where by "amorphous" is meant that the atomic structure of the material has no long range order. Suitable materials are also characterized by exhibiting ionic or partially ionic, covalent or partially covalent bonding. Dry process materials useful herein include, but are not limited to, hydrogenated diamond-like carbon (DLC), amorphous carbon, amorphous hydrogenated silicon, SiC, $SiO_2$, glass, $Si_3N_4$, $Al_2O_3$, $CeO_2$, $SnO_2$, $ZnTiO_2$, and the like. In a preferred embodiment the alignment film comprises hydrogenated DLC. It should be understood that any type of film material may be used so long as the film formed is optically transparent, particularly in the visible spectrum.

The preparation of alignment films using dry process materials is described, for example, in co-pending, commonly assigned U.S. patent application Ser. No. 09/028,018, filed Feb. 23, 1998. With this method, for example, a technique such as plasma enhanced chemical vapor deposition is used to deposit an amorphous alignment film on a substrate. It should be understood that, in all cases where gases are used for these methods, it is preferable to use high-purity gases, such as gases with a purity greater than about 95.5%, or more preferably with a purity of about 98.5%–99.9%. For example, a hydrocarbon gas may be used to form a hydrogenated DLC alignment film. Suitable hydrocarbons, which are molecules made up of carbon and hydrogen atoms, include alkanes, alkenes, alkynes and the like. An alkane is defined herein as a compound whose molecules contain only single bonds between carbon atoms, such as methane, ethane, propane, butane, and the like. An alkene is defined herein as a compound whose molecules contain carbon-carbon double bonds, such as ethane, propane, n-butene, and the like. Alkynes are defined herein as compounds whose molecules contain carbon-carbon triple bonds, such as acetylene, propane, 1-butyne, 2-butyne, and the like. Suitable hydrocarbon gases include mixtures of hydrocarbon gases as well as gases made primarily or exclusively of a single kind of hydrocarbon molecule.

In order to obtain a hydrogenated DLC alignment film with high thermal stability, the hydrocarbon gas is preferably diluted with helium. The term "diluted" is defined herein as an admixture of a hydrocarbon with a gas, such as helium, such that the final concentration of the hydrocarbon in the admixture constitutes preferably from about 0.5% to about 90% of the admixture. It is preferred that helium dilutions result in a final hydrocarbon concentration of about 2% to about 50%.

Dry process methods also make possible an increase in the thickness of the alignment film without sacrificing the optical characteristic of the film. By adding an additional element, such as hydrogen, to the alignment film (which increases its optical transparency) thicker alignment films can be formed with suitable optical transparency characteristics, providing greater design flexibility in the manufacturing of LC cells of LCDs.

Liquid crystal displays comprise a conducting layer as well as an alignment layer. To produce a conducting layer, a conductor, preferably a conductor that is transparent to visible light, is placed on the substrate, typically prior to placement of the alignment film, so that the conducting layer lies between the substrate and the alignment film. Typically, a metal oxide film is positioned between the substrate and the alignment film which serves to set up a voltage across the cell of a liquid crystal display produced therefrom. The conducting layer is commonly patterned. Thus, the metal oxide film may be arranged in rows and columns (as found in passive matrix displays) or patterned as the individual pixels of an active matrix display. Metal oxides from which this film may be fabricated include: indium tin oxide, tin oxide, and the like, where the preparation of such layers is known to those of skill in the art.

In order to produce an alignment layer from the alignment film present on the substrate surface, the alignment film is bombarded with ions, i.e., exposed to or irradiated by a beam consisting of atoms, molecules, or clusters with neutral or ionic charge. The ion beam may be produced by any of the several means known in the art. For example, the ion beam may be generated in an ion beam generating device from a gas, where such devices are known to those of skill in the art. See U.S. Pat. No. 5,661,366 to Hirota et al., which discloses an ion beam accelerating device; U.S. Pat. No. 5,151,605 to Politiek et al., which provides a method and device for producing and directing a low-energy particle beam; U.S. Pat. No. 5,065,034 to Kawanami et al., which discloses a charged particle beam apparatus with slit plates; U.S. Pat. No. 4,939,360 to Sakai, which discloses a particle beam irradiating apparatus; U.S. Pat. No. 4,785,188 to Mori et al., which discloses a primary particle beam irradiation apparatus; U.S. Pat. No. 4,683,378 to Shimase et al., which provides an apparatus for focusing and directing an ion beam onto a target, which may move, and for scanning the beam; and U.S. Pat. No. 4,568,833 to Roelofs, which discloses an apparatus with mirrors to form an array or series of charged beams.

A representative ion beam generating device is disclosed in U.S. patent application Ser. No. 09/028,018, filed Feb. 23, 1998 (cited earlier herein). This representative ion beam generating device includes electrodes for extracting ions from a plasma generated in an enclosure such as a bell jar. For example, the device may include an accelerating electrode, a ground electrode, and a pulling electrode. A device to hold a substrate with an alignment film is located within the bell jar. A plasma generating unit is a source of the ions of the ion beams. The bell jar may be evacuated, by use of a vacuum pump or similarly effective means, and then refilled with low pressures of a selected gas. Appropriate pressures of a selected gas may range from about $1\times10^{-4}$ Torr to about $1\times10^{-5}$ Torr, although other pressures are also be suitable.

Different gases from which the ion beam may be generated include: noble or inert gases, such as helium (He), argon (Ar), neon (Ne), krypton (Kr) and xenon (Xe); an admixture of a noble gas with an active gas, such as nitrogen, fluorine, oxygen, a fluorocarbon, or a hydrocarbon, or combinations thereof. The energy of the ion beam will be at least about 5 to 500 eV, usually at least about 10 to 200 eV and more usually at least about 20 to 100 eV, where the energy value of the ion beam will not exceed about 1000 eV and usually will not exceed about 500 eV.

Figure 1:
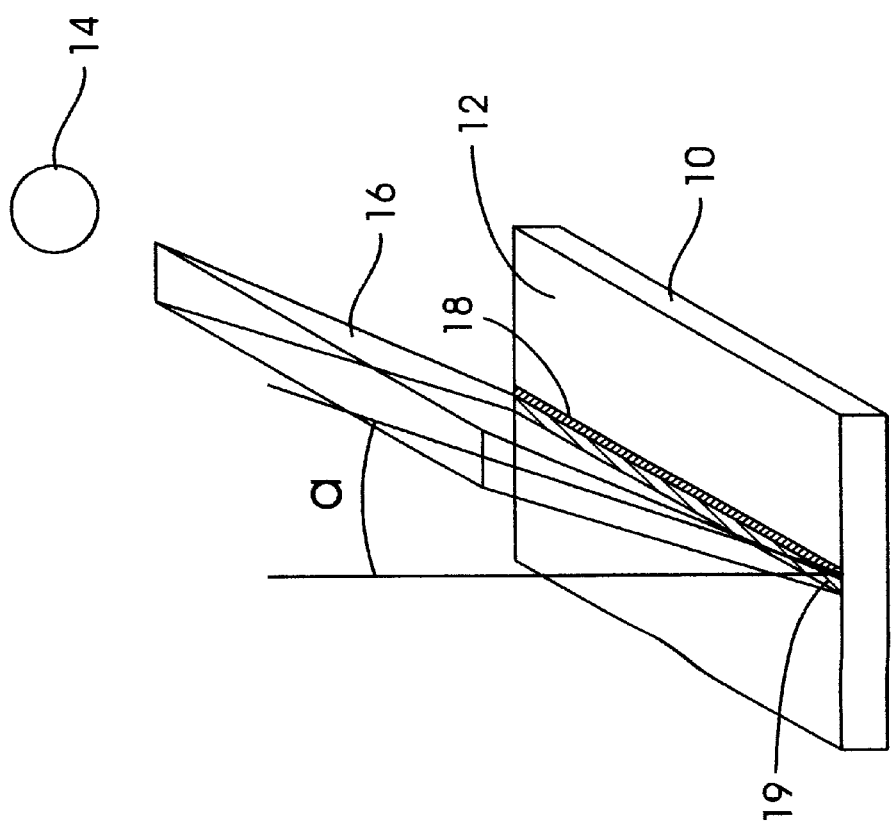
FIG. 1 provides a representation of ion beam bombardment of a substrate surface according to the method of the invention.

An ion beam can be directed at a surface at varying angles, with variable intensity and for varying durations. In the methods of the present invention, the direction of the ion beam will not be perpendicular to the alignment film surface. In other words, the alignment film will be bombarded with an incident ion beam that arrives at the alignment film at an angle to the surface not equal to 90°. To achieve a reliable multi-domain alignment layer, the flux of neutral species that impact the alignment film is preferably minimized. The ion beam may contact the surface in a region of any arbitrary shape; in a preferred embodiment the ion beam contacts the surface in a rectangular or stripe-shaped region. An example of one of the many suitable devices and protocols for generating an ion beam for bombardment of the surface of an alignment film on a substrate surface is shown in FIG. 1 of U.S. Pat. No. 5,770,826 to Chaudhari et al., of common assignment herewith.

To produce the alignment layer, the alignment film will be irradiated or exposed to the incident ion beam for a period of time sufficient to produce the desired anisotropic atomic arrangement on the film surface. The dose of ions impacting the surface is an important parameter. Thus, the period of time during which the film is exposed to the ion beam depends on the ion beam energy and the ion flux. Greater ion flux will require shorter exposure time to provide a desired dose of ions, while lesser ion flux will require a longer exposure time to provide the same dose of ions. A typical ion beam dose will generally range from about $1\times10^{14}$ to $1\times10^{18}$ ions/cm$^2$, usually from about $10^{15}$ to $10^{17}$ ions/cm$^2$ and more usually from about $5\times10^{15}$ to $5\times10^{16}$ ions/cm$^2$. A typical angle of incidence will generally be between 15° and 75°, usually between 25° and 65° and more usually between 30° and 60°. The angular spread around the mean angle of incidence will generally be ±15°, usually ±10° and more usually ±5°.

In the method of the present invention, an alignment film is bombarded by an ion beam or beams from more than one direction. In order to effect different ion beam directions, the ion beam source will be moved, or the substrate will be rotated in the plane of its surface. For example, the substrate may be rotated 180° so that the orientation of the substrate, surface and alignment layer created by the bombardment are opposite to the orientation immediately following the bombardment. The alignment film will be again irradiated or exposed to the incident ion beam for a period of time sufficient to produce the desired anisotropic atomic arrangement on the film surface. The incident ion beam of this second irradiation or exposure may contact the surface at the same, or overlapping, or different location on the surface. In a preferred embodiment, the incident ion beam of this second irradiation or exposure contacts the surface at a location on the surface adjacent to the contact location of the prior irradiation or exposure. The process may be repeated multiple times. Alternatively, multiple ion beam sources may bombard the alignment film simultaneously from different directions, with the same or differing intensities and durations of bombardment, to contact the alignment film and produce multiple alignment directions in the alignment film. In these ways, multiple domains with differing orientation may be created in the alignment layer.

As a result of the process by which it is fabricated, the resultant alignment layer will be characterized by an anisotropic surface in which there are at least two different regions, usually a plurality of different regions, that differ from each other in terms of the distribution of the out-of-plane bonds at the surface. That is, each region comprises an out-of-plane distribution of bonds which is asymmetric with respect to the surface normal and this asymmetric distribution differs for adjacent regions on the alignment film surface. Any pattern providing multiple regions that differ in the distribution of the out-of-plane bonds at the surface is suitable for providing a multi-domain alignment layer. The pattern of different alignment regions or domains will typically be in the form of stripes spread across the surface of the alignment layer, where the asymmetric out-of-plane bond distribution in any two given adjacent stripe regions will be either pointing away from each other (i.e., opposite) or pointing towards each other. Between any two stripe regions in which the alignment direction is opposite, i.e. in which the bond alignment directions point away from each other, there will typically be a narrow dividing region in the alignment layer of substantially no alignment, where the width of this narrow dividing region will typically not exceed about 50 microns, usually will not exceed about 20 microns and more usually will not exceed about 10 microns. Since the alignment layers produced by the subject invention are made up of at least two different asymmetric out-of-plane bond distributions, they are multi-domain alignment layers. Preferably, the alignment layers are produced such that in each color cell within a pixel region of the alignment layer, there are two alignment regions, where the directions of the two alignment regions point towards each other or away from each other. The alignment layers produced by the subject methods are further characterized by being able to align liquid crystals with a pre-tilt angle, where this pre-tilt angle ranges from about 0 to 15 degree, usually from about 1 to 6 degrees.

The resultant alignment layers find use in the fabrication of liquid crystal displays, particularly for use in flat panel displays. The production of liquid crystal displays from suitable substrates having an appropriately aligned surface is well known in the art. Generally, two substrates having an aligned surface are positioned relative to each other such that the substrates are substantially parallel to each other, with the surfaces containing the alignment layers facing each other, with the alignment direction of one surface perpendicular to the alignment direction of the other surface. With alignment layers produced according to the present invention, there are multiple alignment directions on each alignment layer, the present invention providing a multi-domain alignment layer. When positioning two substrates with alignment layers according to the present invention, the substrates will be positioned substantially parallel to each other, with the alignment directions of corresponding domains on the alignment layer of one substrate substantially perpendicular to the alignment directions of corresponding domains on the alignment layer of the other substrate. For example, multi-domain alignment layers produced so that the domains take the form of parallel stripes along the surface of the substrate can readily be positioned as described by positioning the long axis of these stripes horizontally for one substrate and positioning the long axis of the stripes of the other substrate vertically. In this way, for example, one achieves two or four different regions or domains for every color cell of any given pixel, e.g. a right-handed domain and a left-handed domain, or two right-handed domains and two left-handed domains. Those skilled in the art will recognize that there are many other acceptable patterns, and that this example is only one of many suitable ways to provide multi-domain alignment layers of the invention. Spacer means, e.g. spacer balls, capable of maintaining a space between the two substrates, e.g. from about 2 to 10 µm, usually about 5 µm, are then positioned between the substrates. Liquid crystal is then introduced into the space between the plates. A variety of different suitable liquid crystals are known to those of skill in the art. See Jérôme, "Surface Effects and Anchoring in Liquid Crystals," Rep. Prog. Phys. (1991) 54:391–451; see also Lee et al., Microscopic Molecular Re-orientation of Polymer Surfaces Induced by Rubbing and Factors Determining LC Pretilt Angles, in POLYMER SURFACES AND INTERFACES: CHARACTERIZATION, MODIFICATION AND APPLICATION (1997) pp 295–315. The interior space comprising the liquid crystals is then sealed from the environment to produce a liquid crystal display device. The resultant liquid crystal displays find use in a variety of different applications, including as a flat panel display in laptop computers, as a flat panel display for desktop monitors, as a flat panel display for television viewing, and the like.

It is to be understood that while the invention has been described in conjunction with the preferred specific embodiments thereof, that the foregoing description as well as the example which follows are intended to illustrate and not limit the scope of the invention. Other aspects, advantages and modifications within the scope of the invention will be apparent to those skilled in the art to which the invention pertains.

EXPERIMENTAL

The following example is put forth so as to provide those of ordinary skill in the art with a complete disclosure and description of how to prepare and use the methods, substrates, alignment layers, and liquid crystal displays, disclosed and claimed herein. The following example are offered by way of illustration and not by way of limitation.

EXAMPLE

A. Production of Substrate with Alignment Film on its Surface.

A glass substrate having an alignment film on its surface is prepared. The alignment film is hydrogenated DLC and is prepared by the method described in U.S. patent application Ser. No. 09/028,018, filed Feb. 23, 1998 (cited earlier herein). The hydrogenated DLC film is deposited using a plasma enhanced vapor deposition chemical process as follows. The glass substrate is placed on a radio frequency (RF) cathode inside a reaction chamber, which is then evacuated to $1 \times 10^{-5}$ Torr. Argon gas is next introduced into the chamber. The substrate is then cleaned for 1 minute in an argon plasma at a pressure of $5 \times 10^{-3}$ Torr and an RF power density of 0.31 W/cm$^2$. The hydrocarbon gas ethane is diluted with helium to produce an admixture so that the final concentration of the ethane in the admixture constitutes about 50%. The reaction chamber is then filled with the ethane-helium admixture to provide a total pressure of $200 \times 10^{-3}$ Torr. A plasma of the gas admixture is created by holding the cathode bias at –125 V while applying an RF power density of 15 mW/cm$^2$. The hydrogenated DLC alignment film is thereby deposited to provide an essentially continuous film coating onto the substrate.

B. Ion Bombardment of Alignment Film

As shown in FIG. 1, a substrate 10, having a surface with an alignment film 12 as prepared in part (A), is placed near to an ion beam source 14. The substrate 10 is bombarded with an incident ion beam 16 produced by the ion beam source 14, the beam angle of incidence to a line normal to the surface being a. A region 18 on the alignment film 12 is bombarded for 1 min. with incident Ar+ ions of 75 eV energy, using the device disclosed in FIG. 1 of U.S. Pat. No. 5,770,826 to Chaudhari et al. The total ion dose delivered by this bombardment is between about $5 \times 10^{15}$ and about $5 \times 10^{16}$ ions/cm$^2$. The substrate is rotated 180° in the plane of the substrate following this bombardment. Another region 19 of the alignment film 12 adjacent to the previously-bombarded region 18 is then similarly bombarded to form a multi-domain alignment layer.

In a variant of this process, multiple regions of the alignment film are bombarded while the substrate and alignment film are in the initial position. The total bombardment duration is increased, in an approximately linear relation with the increase in the number of alignment film regions that are bombarded, so that as more regions of the alignment film are bombarded, the total ion dose delivered per cm$^2$ remains approximately constant. Next, after rotation of the substrate to a second position, a corresponding number of other regions of the alignment film, adjacent the regions irradiated in the previous step, are bombarded, to form a multi-domain alignment layer.

C. Ion Bombardment of Alignment Film with Multiple Ion Beam Sources

Alternatively, two ion beam sources may be used simultaneously to bombard the substrate from different angles of incidence. FIG. 2 shows the embodiment wherein two ion beam sources 22 and 23 direct ion beams 24 and 25 from different angles of incidence a and –a simultaneously to bombard an alignment film 21 on a substrate 20. Each ion beam bombards the alignment film for 1 min. with incident Ar+ ions of 75 eV energy, using the ion beam source of part (B), each ion beam delivering a total ion dose of between about $5 \times 10^{15}$ and about $5 \times 10^{16}$ ions/cm$^2$. FIG. 2 shows the regions of contact 26 and 27 between the ion beams 24 and 25 and the alignment film 21 where the two ion beams 24 and 25 contact the surface of the alignment film 21 on the substrate 20 simultaneously at different angles of incidence a and –a. The trajectories of the Ar+ ions of ion beams 24 and 25 as they contact the alignment film surface 21 are shown as lying within the rectangular regions 26 and 27 that meet at the surface. The bombardment creates differently-oriented alignment layers in the two contact regions 26 and 27. When a liquid crystal is placed on the resultant alignment layer, the liquid crystal molecules align nearly parallel with the surface, but are tilted up slightly in different directions on either side of the line shown demarking the boundary between the regions of contact 26 and 27 of the two ion beams 24 and 25.

D. Preparation of Flat Panel Display

Figure 3:
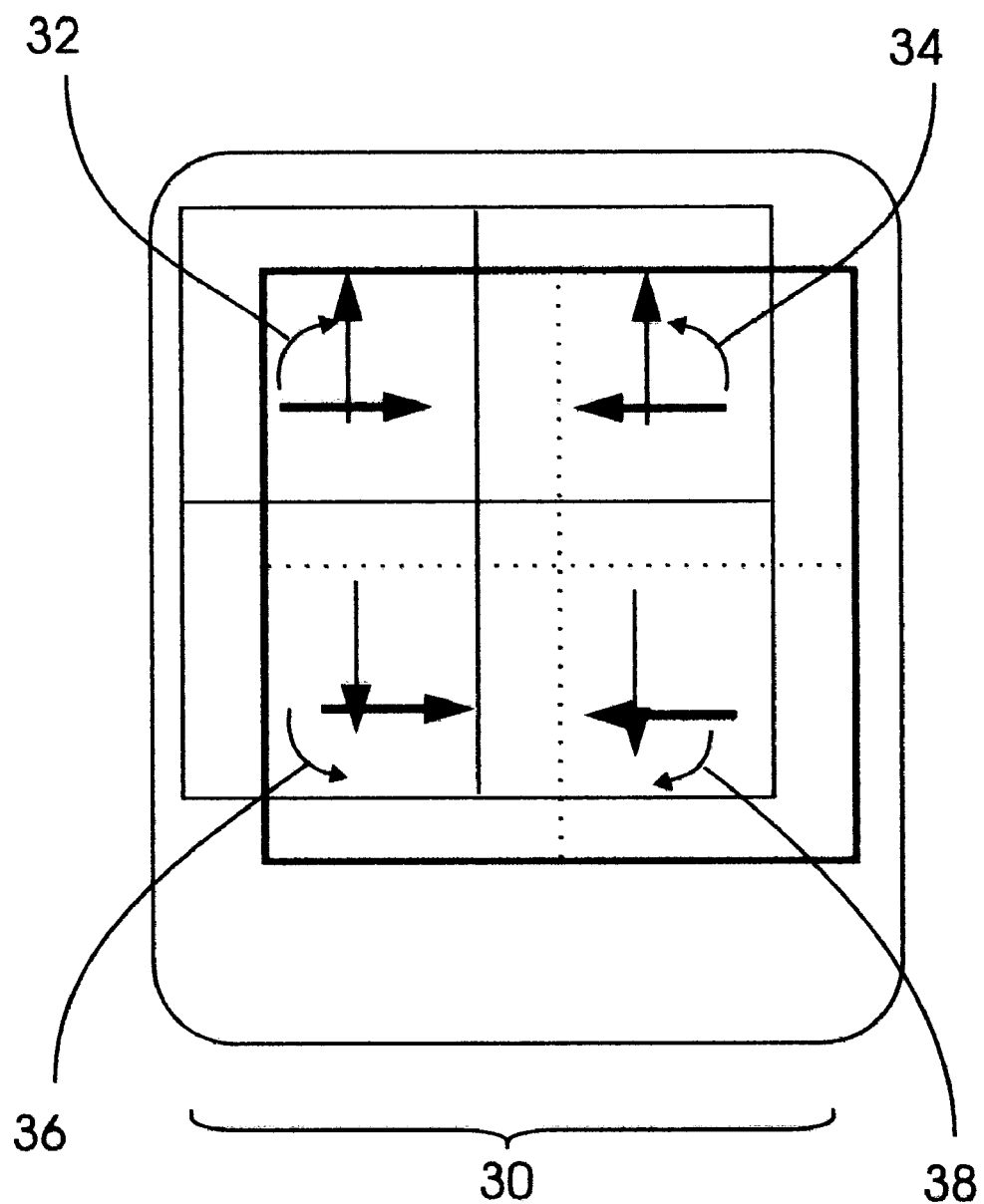
FIG. 3 provides a representation of the alignment directions on an alignment layer produced according to the subject invention, as well as a multi-domain pixel in a liquid crystal display device fabricated from the alignment layer.

Two panels are prepared according to the process described in part (B) above, from which a flat panel display is to be prepared. It is to be understood that two panels could be prepared according to the process described in part (C) above, or one panel prepared according to part (B) and one panel according to the process described in part (C), with equal success and utility of result. A liquid crystal display is produced from the two panels with a chiral liquid crystal according to methods known in the art, as summarized above and disclosed in the numerous patent references discussed throughout this application. FIG. 3 illustrates the resultant liquid crystal display that is characterized by having a color cell of pixels 30 each divided into four domains, 32, 34, 36 and 38, where the liquid crystal orientation in each domain differs as shown by the arrows in FIG. 3. The straight arrows represent the projections of the ion beam bombardment vectors on the substrates. The substrates are oriented so that the vectors on one substrate are substantially perpendicular to those vectors in corresponding regions on the opposing substrate. The curved arrows represent the direction of the rotation of the chiral LC molecule orientations in the space between the panels.

It is evident from the above results and discussion that improved methods of producing multi-domain liquid crystal displays are provided. In the subject methods, no complicated mechanical alignment steps, such as rubbing, are employed. Since there is no mechanical contact with the alignment surface, the need for extensive cleaning of the surface is avoided. Furthermore, complicated mask processes are also not employed. As such, the methods of the invention provide relatively simple and effective means of producing alignment layers for use in producing multi-domain liquid crystal displays.

All publications, patents and patent applications cited in this specification are herein incorporated by reference as if each individual publication, patent or patent application were specifically and individually indicated to be incorporated by reference in their entireties. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method of producing a multi-domain alignment layer on a substrate, comprising:
    (a) providing a substrate having an alignment surface thereon, said alignment surface defining a plane, wherein the alignment surface is comprised of a material capable of exhibiting an aligned molecular structure;
    (b) forming a first alignment direction on the alignment surface by directing an ion beam at the surface at a non-normal angle of incidence to the plane;
    (c) rotating the substrate; and
    (d) forming a second alignment direction on the alignment surface by directing the ion beam at the surface at the non-normal angle of incidence to the plane.

2. The method of claim 1, wherein the rotation of the substrate is in the plane of said substrate.

3. A method of producing a multi-domain alignment layer on a substrate, comprising:
    (a) providing a substrate having an alignment surface thereon, said alignment surface defining a plane, wherein the alignment surface is comprised of a material capable of exhibiting an aligned molecular structure;
    (b) forming a first alignment direction on the alignment surface by directing an ion beam at the surface at a first non-normal angle of incidence to the plane; and
    (c) forming a second alignment direction on the alignment surface by directing an ion beam at the surface at a second non-normal angle of incidence to the plane.

4. The method of claim 3, wherein the first and second alignment directions are formed by the operation of two distinct ion beams.

5. The method of claim 3, wherein said angles of incidence are equal and opposite.

6. The method of claim 4, wherein said angles of incidence are equal and opposite.

7. A method for making a liquid crystal display, comprising:
    (a) providing a first substrate, said substrate having a conducting layer thereon, said conducting layer capable of operable connection to an electrode, and an alignment surface on said conducting layer and said substrate;
    (b) providing a second substrate, said second substrate having a conducting layer thereon, said conducting layer capable of operable connection to an electrode, and an alignment surface on said conducting layer and said substrate;
    (c) producing a multi-domain alignment layer by the method of claim 1 upon said first substrate;
    (d) producing a multi-domain alignment layer by the method of claim 1 upon said second substrate;
    (e) positioning said first substrate and said second substrate in a substantially parallel relationship to each other, said substrates being separated by a distance, whereby said distance and said substrates define a gap region between said substrates; and
    (d) introducing a liquid crystal material into said gap region between the first and the second substrates;
    (e) providing polarizers outside of said gap region effective to polarize light passing through said substrates;
    (f) operably connecting electrodes to said conducting layers;
whereby a multi-domain liquid crystal display is made.

8. A method for making a liquid crystal display, comprising:
    (a) providing a first substrate, said substrate having a conducting layer thereon, said conducting layer capable of operable connection to an electrode, and an alignment surface on said conducting layer and said substrate;
    (b) providing a second substrate, said second substrate having a conducting layer thereon, said conducting layer capable of operable connection to an electrode, and an alignment surface on said conducting layer and said substrate;
    (c) producing a multi-domain alignment layer by the method of claim 3 upon said first substrate;
    (d) producing a multi-domain alignment layer by the method of claim 3 upon said second substrate;

(e) positioning said first substrate and said second substrate in a substantially parallel relationship to each other, said substrates being separated by a distance, whereby said distance and said substrates define a gap region between said substrates; and (d) introducing a liquid crystal material into said gap region between the first and the second substrates;

(e) providing polarizers outside of said gap region effective to polarize light passing through said substrates;

(f) operably connecting electrodes to said conducting layers;

whereby a multi-domain liquid crystal display is made.

9. A substrate having an alignment layer thereon, wherein said alignment layer is produced according to the method of claim 1.

10. A substrate having an alignment layer thereon, wherein said alignment layer is produced according to the method of claim 3.

11. A multi-domain liquid crystal display produced according to the method of claim 7.

12. A multi-domain liquid crystal display produced according to the method of claim 8.

* * * * *